UNITED STATES PATENT OFFICE.

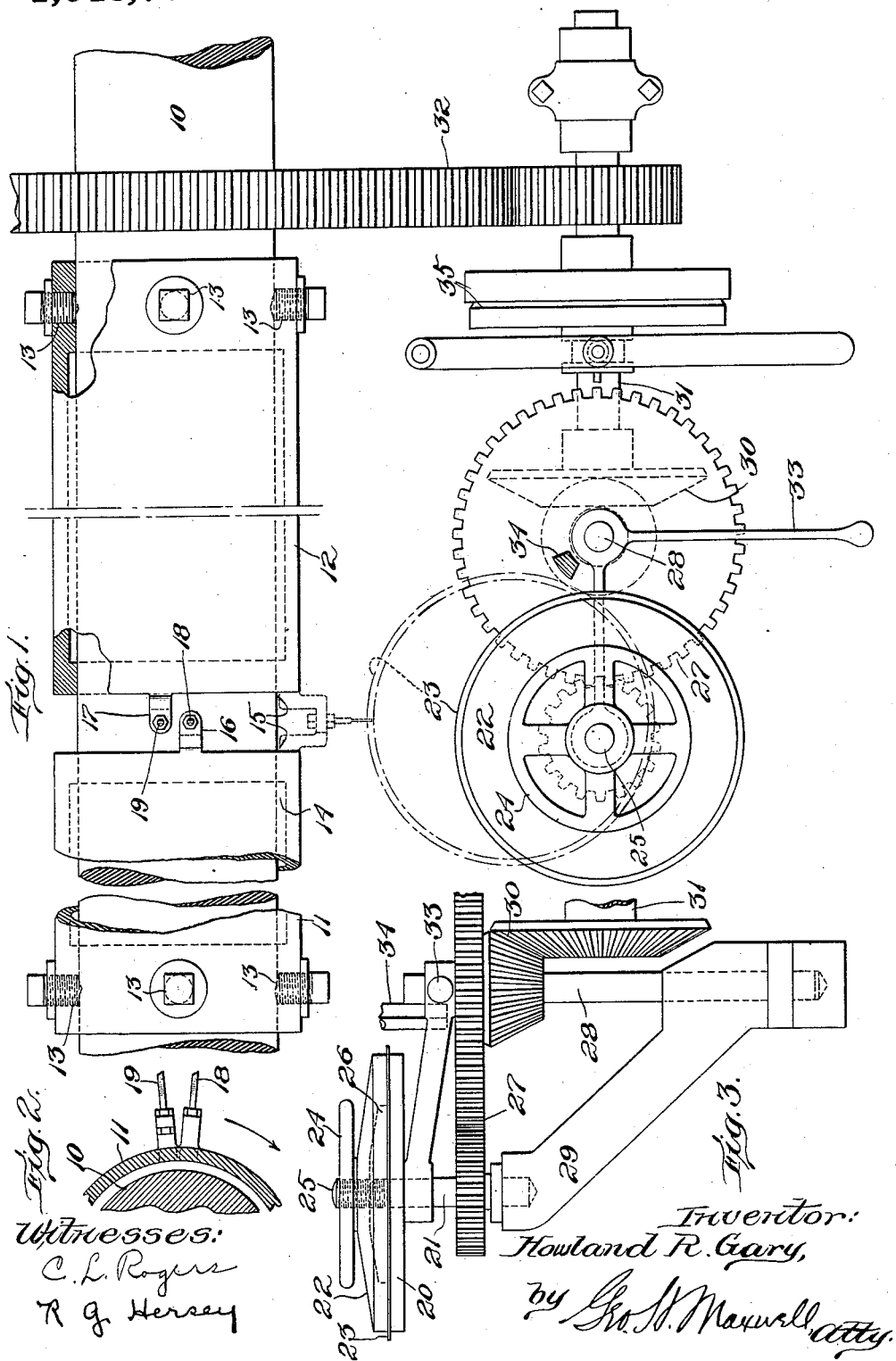

HOWLAND R. GARY, OF POTOMAC, VIRGINIA, ASSIGNOR OF ONE-HALF TO HENRY H. CUMMINGS, OF NEWTON HIGHLANDS, MASSACHUSETTS.

APPARATUS FOR MEASURING THE TWIST OF SHAFTS.

1,046,768.  Specification of Letters Patent.  Patented Dec. 10, 1912.

Application filed November 22, 1911. Serial No. 661,791.

*To all whom it may concern:*

Be it known that I, HOWLAND R. GARY, a citizen of the United States, and resident of Potomac, county of Alexandria, State of Virginia, have invented an Improvement in Apparatus for Measuring the Twist of Shafts, of which the following description, in connection with the accompanying drawings, is a specification, like letters on the drawings representing like parts.

In the present invention I take advantage of the almost perfectly elastic quality of the high grade steel used in power transmission shafting to provide measuring and recording means responsive to the elastic twisting distortion of a section of such shafting for recording the amount of twist in such shaft-section, and hence as the amount of elastic distortion is proportional to the amount of power transmitted, by reference to a constant or table, the horse power being delivered from the motor to the driven element can be instantly ascertained.

My invention provides elements adapted to be rigidly connected to separated portions of an integral shaft section, such elements being arranged to both mark, in the present instance by cutting, a common record member movable in their path of operation, the arrangement being such that the different positions of the marks (or cuts) made by the two marking elements on the movable record are adapted to indicate the extent of elastic distortion of the shaft portion between the points at which the marker holding elements are clamped thereto.

The invention will be better understood from the following detailed description, taken in connection with the accompanying drawings, and will be thereafter pointed out in the appended claims.

Referring to the drawings, Figure 1 is a side elevation of portions of a transmission shaft section with an illustrative embodiment of my invention applied thereto. Fig. 2 is a fragmentary transverse section with the cutting fingers in elevation, and Fig. 3 is an elevation of the record holder and its immediate driving connections.

10 indicates an integral section of line transmission shafting broken away, the extremities of the portions shown being in practice usually from ten to twenty feet apart. Similar sleeves 11, 12 of like form and of a combined length equaling that of the portion of shafting to which the device is to be fitted are clamped to the shaft by set screw bolts 13 or other suitable clamping means. These sleeves extend loosely over the shaft toward each other for most of their length, some little clearance space being shown between these parts as at 14. The inner extremities of these sleeves, which are quite close to each other, are drawn in to nicely fit the shaft as seen at 15, and ears or lugs 16, 17 extend inward from the end of either sleeve toward the other, the extremities of these lugs carrying knife blades 18, 19 normally lying in a common plane transverse of the shaft section and extending out some distance from the periphery of the sleeves as seen in Fig. 2. A rotary table 20 is fixed on an upstanding shaft 21 with a cover 22 fitted thereover and adapted to be clamped down on to a record sheet 23 on the table by a hand wheel 24 threaded on the upper end of the shaft 21, as seen at 25. The table 20 is shown as provided with a central boss 26 of a size to fit the central hole of annular disk records for properly positioning and centering the same. The shaft 21 is driven by spur gear connections 27 from a shaft 28 which constitutes an axis of swinging adjustment about which the mounting 29 of shaft 21 is adapted to turn. The shaft 28 is driven by bevel gear connections 30 from a shaft 31 which is in turn driven by spur gear connections 32 from the transmission shaft 10. The mounting 29 of the record carrying shaft 21 is adapted to be swung around from the inoperative full line position of Fig. 1 to the dotted line position of this figure by a handle arm 33 and is prevented from moving too far inward toward the cutter knives by a stop 34 interposed in its path of movement. When the record disk is in the dotted line position of Fig. 1, its projecting edge is in the path of the cutter knives 18, 19 which, as stated, normally move in the same circular plane when the shaft section is not distorted. The gearing connections, consisting in the gears 32, shaft 31, bevel gears 30 and spur gears 27, are so proportioned that the disk record 23 is rotated at a ratio which is a definite and exact multiple of the rate of rotation of shaft 10, this ratio being in practice usually 20 to 1, or 10 to 1. The blades 18, 19 are set a definite and exact angular distance apart, for example, 9°. Assuming, then, that the ratio of rotation between the record disk 23 and the shaft 10 is 20 to 1, and that the blades are set 9° apart, it is apparent that with no twisting distortion of the shaft, the cuts made by the knives in the record disk will be 9x20, or 180° apart. Let the shaft portion between the clamp 13 then suffer an elastic distortion of, say 1°, so that the knife blades are, say 10° or 8° apart instead of 9°,—depending on the direction of drive,—the cuts then made in the record disk will be 200° or 160° apart, as the case may be, instead of 180°. Thus, with the supposed ratio of parts the difference between the angular distance between the cuts and 180° divided by 20 will always give the angular elastic distortion in the portion of shaft 10 between the clamping points at 13. From this data the amount of power being transmitted to produce this degree of torque or twist can be readily ascertained by a predetermined constant or table. In practice, a suitable clutch 35 is interposed in the transmitting connections as in the shaft 31 so that the record holder is only driven when required, and may be stopped to put in and take out record sheets. This clutch is, however, not necessary as I have discovered that the record sheet will remain seated on the rotating table 20 without the clamping cover 22 and that the record sheet can be easily placed on the table and removed while the table is rotating at full speed as driven by the shaft 10.

Among the distinctive advantages of my improved construction are to be noted its extreme simplicity and cheapness, its capacity for quick and convenient application to a section of shafting without mutilation or weakening of the shafting. A further advantage is the compactness and accessibility of the operative parts and the capability of quickly fixing the record disk in place and shifting it, with its holder, to operative position.

A further and specially important point of advantage is that a reading of the torque or twist distortion, and hence an indication of the power being transmitted, can be had instantly at any time without in any way interfering with the normal operation of the power transmitting connections.

I am aware that numerous changes in construction can be made without departing from the spirit of the invention and I therefore desire the particular form shown to be understood as illustrative and not restrictive, as I desire to cover the invention broadly and without regard to structural details or other limitations, except as set forth in the more specific of the appended claims.

Having described my invention, what I claim as new and desire to secure by Letters Patent is:

1. An apparatus of the kind described, comprising elements adapted for attachment to a shaft section at separated points and each carrying a marking device, and means for moving a record receiving element in definite relation to said marking devices and in position to be marked thereby.

2. An apparatus of the kind described, comprising elements adapted to be secured to a shaft section at separated points thereof and each carrying a separate marking device to be turned with the shaft, and means for moving a record receiving member in position to be marked by said marking devices and at a predetermined ratio relative to the speed of said devices.

3. An apparatus of the kind described, comprising elements adapted to be secured to a shaft section at separated points thereof and having separate marking devices spaced a predetermined angular distance apart, and means for moving an endless record receiving member in position to be marked by said marking devices and at a predetermined ratio relative to the speed of said devices.

4. An apparatus of the kind described, comprising elements adapted to be secured to a shaft section at separated points thereof, marking devices carried by said elements normally at a predetermined angular distance apart and in a common plane transverse of the shaft, and means for moving an endless record receiving member at a predetermined ratio relative to the speed of said marking devices.

5. An apparatus of the kind described, comprising members adapted to be secured to a shaft section at separated portions thereof and carrying separate marking devices normally spaced a definite angular distance apart, a rotary holder for a record receiving member adapted to carry said member in position to be engaged by said marking devices, and connections from the shaft section for turning said holder at a predetermined ratio relative to the speed of the shaft.

6. An apparatus of the kind described, comprising sleeves adapted to be fitted to a shaft section and fixed thereto at separated points carrying cutter blades projecting therefrom normally at a definite angular distance apart and in the same plane transverse of the shaft, and means for moving an endless record sheet at a predetermined ratio relative to the speed of said blades.

7. An apparatus of the kind described, comprising elongated sleeves having provision for clamping at their outer ends to a shaft section and with marking devices carried at their inner ends normally a definite angular distance apart, a rotary holder for a record receiving member adapted to bring the record receiving member carried thereby into engagement with said marking devices, and means for moving said holder at a definite ratio relative to the speed of the marking devices.

In testimony whereof, I have signed my name to this specification, in the presence of two subscribing witnesses.

HOWLAND R. GARY.

Witnesses:
C. L. ROGERS,
HENRY H. CUMMINGS.